(12) United States Patent
Javidi et al.

(10) Patent No.: US 11,537,906 B2
(45) Date of Patent: Dec. 27, 2022

(54) MACHINE LEARNING BASED TARGET LOCALIZATION FOR AUTONOMOUS UNMANNED VEHICLES

(71) Applicant: The Regents of the University of California, Oakland, CA (US)

(72) Inventors: Tara Javidi, San Diego, CA (US); Yongxi Lu, San Diego, CA (US); Zeyangyi Wang, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 662 days.

(21) Appl. No.: 16/510,203

(22) Filed: Jul. 12, 2019

(65) Prior Publication Data

US 2020/0334551 A1 Oct. 22, 2020

Related U.S. Application Data

(60) Provisional application No. 62/697,350, filed on Jul. 12, 2018.

(51) Int. Cl.
*G06N 5/04* (2006.01)
*G06N 20/00* (2019.01)
*G05D 1/00* (2006.01)

(52) U.S. Cl.
CPC ............ *G06N 5/04* (2013.01); *G05D 1/0094* (2013.01); *G06N 20/00* (2019.01); *G05D 1/0088* (2013.01)

(58) Field of Classification Search
CPC ............ G06N 5/04; G06N 20/00; G06N 3/08; G06N 3/0454; G06N 7/005; G05D 1/0094; G05D 1/0088
See application file for complete search history.

(56) References Cited

FOREIGN PATENT DOCUMENTS

TW 201909660 A * 3/2019

OTHER PUBLICATIONS

Huang W, May 14, 2018, English Machine Translation_TW-201909660-A provided by Patent Translate by EPO and Google (Year: 2018).*

(Continued)

*Primary Examiner* — Russell Frejd
*Assistant Examiner* — Ashley L Redhead, Jr.
(74) *Attorney, Agent, or Firm* — Mintz Levin Cohn Ferris Glovsky and Popeo, P.C.

(57) ABSTRACT

A method for localizing a target object may include applying, to a first image captured by an apparatus, a first machine learning model trained to determine whether the target object is visible in the first image depicting a first region of a search area. In response to the target object being absent from the first image, a second machine learning model may be applied to identify, based on the target object as being visible and/or nonvisible in one or more portions of the first image, a second region of the search area corresponding to a sub-region within the first region of the search area having a highest probability of including the target object. A command may be sent to the apparatus to navigate the apparatus to the second region of the search area in order to capture a second image of the second region of the search area.

20 Claims, 13 Drawing Sheets

(56) References Cited

OTHER PUBLICATIONS

Han, S. et al., "Deep Drone: Object Detection and Tracking for Smart Drones on Embedded System," (2016) (available at https://web. stanford. edu/class/cs231a/prev_projects_2016/deepdrone-object_2_.pdf, 8 pages.
Lee, J. et al., "Real-Time Object Detection for Unmanned Aerial Vehicles based on Cloud-based Convolutional Neural Networks," Journal Concurrency and Computation: Practice and Experience 29(6), (2017).
Lu, Y. et al., "Adaptive Object Detection Using Adjacency and Zoom Prediction," arXiv:1512.07711v2 Apr. 11, 2016, 9 pages.

\* cited by examiner

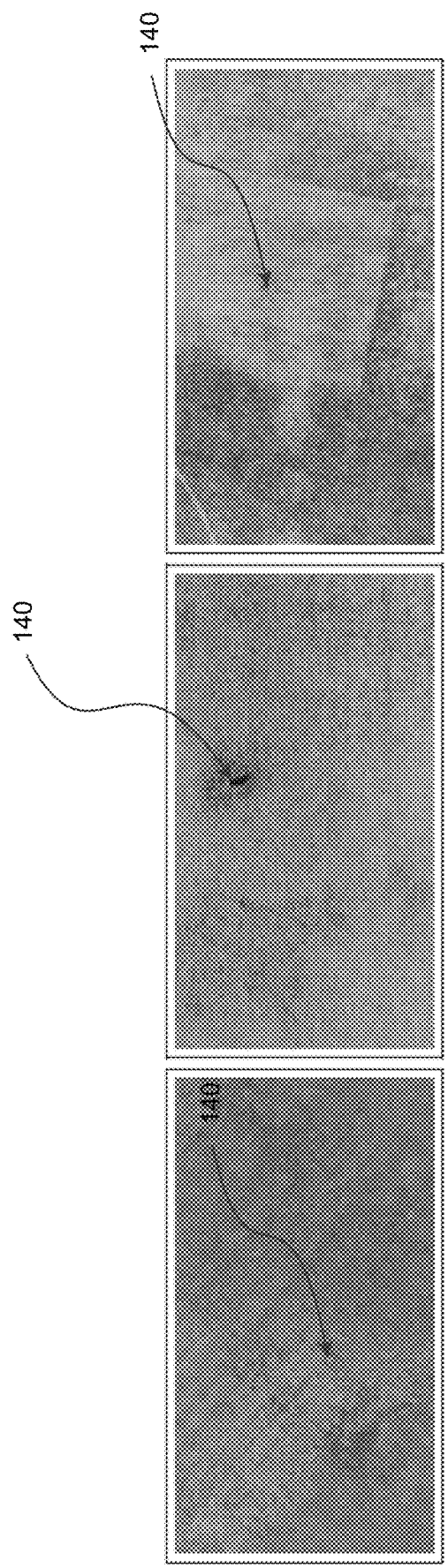

MACHINE LEARNING BASED TARGET LOCALIZATION FOR AUTONOMOUS UNMANNED VEHICLES

RELATED APPLICATION

This application claims priority to U.S. Provisional Application No. 62/697,350 entitled "TARGET LOCALIZATION WITH DRONES USING MOBILE CONVOLUTIONAL NEURAL NETWORKS" and filed on Jul. 12, 2018, the disclosure of which is incorporated herein by reference in its entirety.

STATEMENT OF GOVERNMENT SPONSORED SUPPORT

This invention was made with government support under Grant Numbers CCF1302588, CIF1302438, and CNS1329819 awarded by the National Science Foundation. The government has certain rights in the invention.

TECHNICAL FIELD

The subject matter described herein relates generally to machine learning and more specifically to machine learning based target localization for autonomous unmanned platforms.

BACKGROUND

Unmanned vehicles may refer to remote-controlled vehicles and/or autonomous vehicles that are capable of operating without a human crew onboard. Different types of unmanned vehicles may be configured to navigate a variety of environments including, for example, unmanned aerial vehicles, unmanned ground vehicles, unmanned surface vehicles, unmanned underwater vehicles, unmanned spacecraft's, and/or the like. As such, unmanned vehicles may be deployed for applications that are too hazardous and/or costly to involve a human crew. For example, unmanned aerial vehicles (e.g., drones and/or the like) may be deployed for a variety of tasks including, for example, search and rescue, terrain mapping, aerial surveillance, agricultural surveys, and/or the like.

SUMMARY

Systems, methods, and articles of manufacture, including computer program products, are provided for machine learning based target localization for an autonomous unmanned vehicle. In some example embodiments, there is provided a system that includes at least one processor and at least one memory. The at least one memory may include program code that provides operations when executed by the at least one processor. The operations may include: applying, to a first image captured by an apparatus, a first machine learning model trained to determine whether a target object is visible in one or more portions of the first image, the first image depicting a first region of a search area, and the one or more portions of the first image corresponding to a first plurality of sub-regions within the first region of the search area; in response to the target object being absent from the first image of the first region of the search area, applying a second machine learning model trained to identify, based at least on an output of the first machine learning model indicating the target object as being visible and/or nonvisible in the one or more portions of the first image, a second region of the search area corresponding to one of the first plurality of sub-regions within the first region of the search area having a highest probability of including the target object; and sending, to the apparatus, a command navigating the apparatus to the second region of the search area in order to capture a second image of the second region of the search area.

In some variations, one or more features disclosed herein including the following features can optionally be included in any feasible combination. The first image of the first region may be captured at a first distance relative to the search area. The apparatus may be navigated, based at least on a second distance relative to the search area being associated with a higher visibility level than the first distance, to the second distance in order to capture the second image of the second region. The second machine learning model may be further trained to determine, based at least on a visibility of the target object determined by the second distance relative to the search area and by one or more environmental conditions, a first sensing mode for processing a second image of the second region of the search area. The second machine learning model may identify the first sensing model in response to the second distance being associated with a maximum visibility level and the first machine learning model being unable to detect the target object in the second image by applying a second sensing mode.

In some variations, the second machine learning model may be configured to update, based at least on the output of the first machine learning model indicating the target object as being visible and/or nonvisible in the one or more portions of the first image, a probability distribution of the target object being present in one or more regions of the search area. The second region of the search area may be identified based at least on the updated probability distribution.

In some variations, the first machine learning model may be applied to the second image of the second region of the search area in order to determine whether the target object is visible in one or more portions of the second image. In response to the target object being absent from the second image of the second region of the search area, the apparatus may be navigated to a third region of the search area having a next highest probability of including the target object. The second region of the search area and the third region of the search area may form an optimal search path spanning a three-dimensional space.

In some variations, the second machine learning model may be trained to determine the optimal search path by at least maximizing a reward function corresponding to a movement cost of the apparatus moving to different regions along the optimal search path and/or a sensing cost of detecting a presence of the target object at each region of the search area along the optimal search path. The second machine learning model may be trained by applying one or more reinforcement learning techniques.

In some variations, the third region of the search area may be another one of the first plurality of sub-regions within the first region of the search area. The apparatus may be navigated to the third region of the search area by at least navigating the apparatus in a same horizontal plane.

In some variations, the third region of the search area may be one of a second plurality of sub-regions within the second region of the search area. The apparatus may be navigated to the third region of the search area by at least navigating the apparatus vertically to a different distance relative to the search area.

In some variations, the apparatus may be an autonomous unmanned vehicle.

In some variations, the first machine learning model may be a neural network. The first machine learning model may be trained based at least on one or more training images. The one or more training images may include a first image in which more than a threshold portion of the target object is visible and/or a second image in which less than the threshold portion of the target object is visible.

In some variations, the second machine learning model may be a Markov decision process.

In another aspect, there is provided a method for machine learning based target localization for an autonomous unmanned vehicle. The method may include: applying, to a first image captured by an apparatus, a first machine learning model trained to determine whether a target object is visible in one or more portions of the first image, the first image depicting a first region of a search area, and the one or more portions of the first image corresponding to a first plurality of sub-regions within the first region of the search area; in response to the target object being absent from the first image of the first region of the search area, applying a second machine learning model trained to identify, based at least on an output of the first machine learning model indicating the target object as being visible and/or nonvisible in the one or more portions of the first image, a second region of the search area corresponding to one of the first plurality of sub-regions within the first region of the search area having a highest probability of including the target object; and sending, to the apparatus, a command navigating the apparatus to the second region of the search area in order to capture a second image of the second region of the search area.

In some variations, one or more features disclosed herein including the following features can optionally be included in any feasible combination. The first image of the first region may be captured at a first distance relative to the search area. The apparatus may be navigated, based at least on a second distance relative to the search area being associated with a higher visibility level than the first distance, to the second distance in order to capture the second image of the second region. The second machine learning model may be further trained to determine, based at least on a visibility of the target object determined by the second distance relative to the search area and by one or more environmental conditions, a first sensing mode for processing a second image of the second region of the search area. The second machine learning model may identify the first sensing model in response to the second distance being associated with a maximum visibility level and the first machine learning model being unable to detect the target object in the second image by applying a second sensing mode.

In some variations, the second machine learning model may be configured to update, based at least on the output of the first machine learning model indicating the target object as being visible and/or nonvisible in the one or more portions of the first image, a probability distribution of the target object being present in one or more regions of the search area. The second region of the search area may be identified based at least on the updated probability distribution.

In another aspect, there is provided a computer program product including a non-transitory computer readable medium storing instructions. The instructions may cause operations may executed by at least one data processor. The operations may include: applying, to a first image captured by an apparatus, a first machine learning model trained to determine whether a target object is visible in one or more portions of the first image, the first image depicting a first region of a search area, and the one or more portions of the first image corresponding to a first plurality of sub-regions within the first region of the search area; in response to the target object being absent from the first image of the first region of the search area, applying a second machine learning model trained to identify, based at least on an output of the first machine learning model indicating the target object as being visible and/or nonvisible in the one or more portions of the first image, a second region of the search area corresponding to one of the first plurality of sub-regions within the first region of the search area having a highest probability of including the target object; and sending, to the apparatus, a command navigating the apparatus to the second region of the search area in order to capture a second image of the second region of the search area.

Implementations of the current subject matter may include systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein may be apparent from the description and drawings, and from the claims. While certain features of the currently disclosed subject matter are described for illustrative purposes in relation to machine learning based target localization for autonomous unmanned vehicles, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5A depicts an example variation in visibility level, in accordance with some example embodiments;

FIG. 5B depicts another example variation in visibility level, in accordance with some example embodiments;

FIG. 5C depicts another example variation in visibility level, in accordance with some example embodiments;

When practical, similar reference numbers denote similar structures, features, or elements.

DETAILED DESCRIPTION

Figure 1:
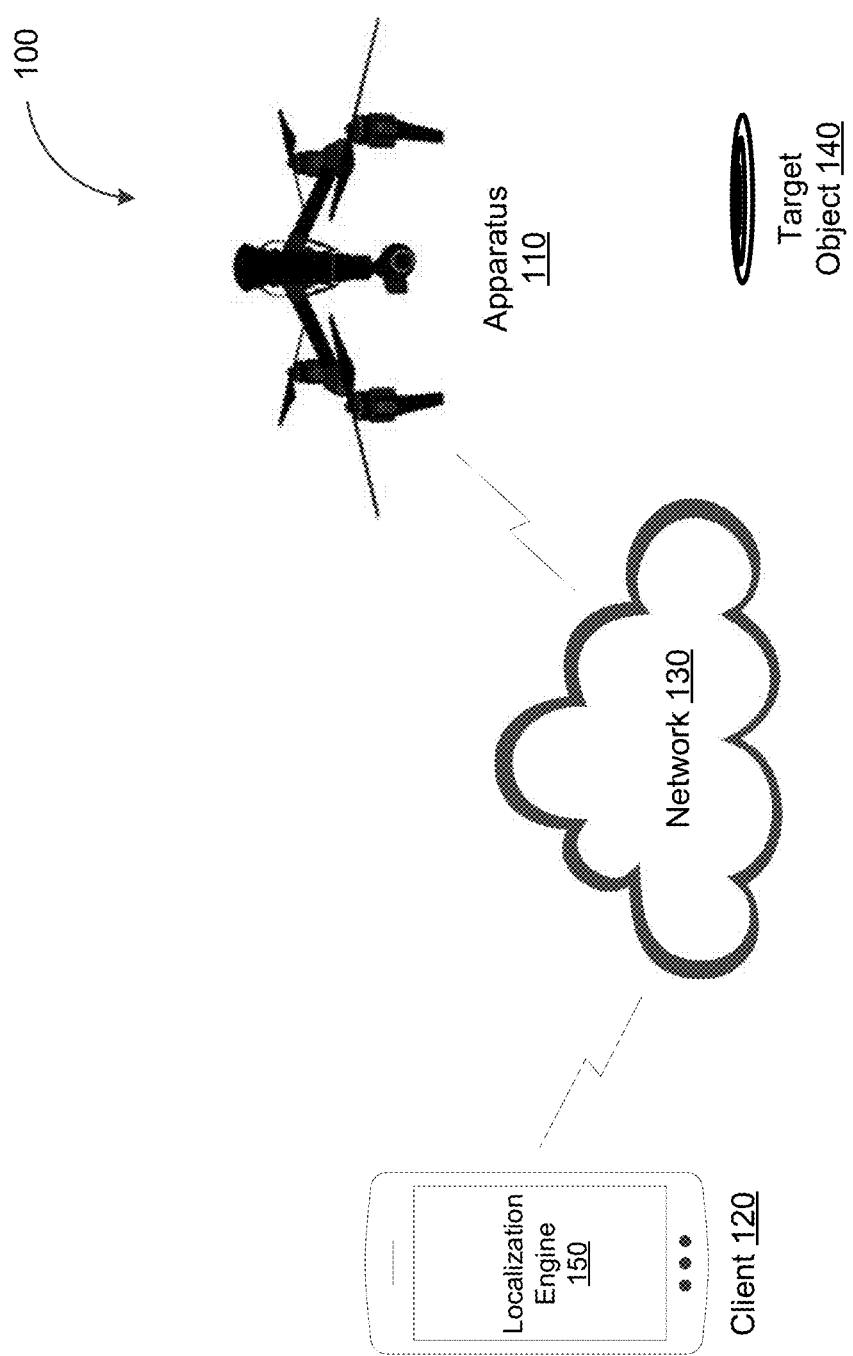
FIG. 1 depicts a system diagram illustrating an example of a target localization system, in accordance with some example embodiments.

An unmanned vehicle (e.g., a drone and/or the like) may be deployed for tasks that require the localization of a target object including, for example, search and rescue, terrain mapping, aerial surveillance, agricultural surveys, and/or the like. The unmanned vehicle may search for the target object including by capturing one or more images of a search area. Each image may depict a different region of the search area including different sized regions of the search area captured from different distances (e.g., heights) relative to the search area. Moreover, each image may be processed by a machine learning model trained to determine the visibility of the target object in each image. If the target object is not visible in one image, the unmanned vehicle may travel to a different region of the search area and capture another image of that region of the search area for processing by the machine learning model. Accordingly, a conventional search strategy in which the unmanned vehicle travels sequentially across the search area while capturing images at each region of the search area for processing by the machine learning model may incur excessive movement cost and sensing cost.

In some example embodiments, a localization engine may include a first machine learning model trained to determine a visibility of a target object in one or more images of a search area captured by an unmanned vehicle (e.g., a drone and/or the like). Moreover, the target localization engine may include a second machine learning model trained to navigate the unmanned vehicle including by determining a next location for the unmanned vehicle. For example, the first machine learning model may determine whether the target object is visible in a first image of a first region of the search area captured by the unmanned vehicle. The second machine learning model may identify, based at least an output of the first machine learning model indicating a visibility of the target object in the first image of the first region of the search area, a second region of the search area having a highest probability of including the target object. The second region of the search area may be a sub-region of the first region of the search area having the highest probability of including the target object. Accordingly, the localization engine may navigate the unmanned vehicle to the second region of the search area where the unmanned vehicle may continue the search for the target object by at least capturing a second image of the second region of the search area for processing by the first machine learning model. By navigating the unmanned vehicle to the second region of the search area having the highest probability of including the target object instead of navigating the unmanned vehicle sequentially across the search area, the localization engine may prevent the unmanned vehicle from avoid traveling to regions of the search area unlikely to include the target object.

In some example embodiments, the localization engine may perform a tree search in which the unmanned vehicle is steered horizontally across the search area as well as vertically to different distances (e.g., heights) relative the search area. For example, the localization engine may steer the unmanned vehicle to a first distance (e.g., height) from the search area in order for the unmanned vehicle to capture the first image of the first region of the search area. As noted, the second region of the search area may be a sub-region within the first region of the search area identified, based at least on the output of the first machine learning model indicating a visibility of the target object in the first region of the search area, as having the highest probability of including the target object. Accordingly, the localization engine may steer the unmanned vehicle to a second distance (e.g., height) from the search area in order for the unmanned vehicle to capture the second image of the second region of the search area. For instance, the localization engine may navigate the unmanned vehicle from the first distance to the second distance by at least changing a flight altitude of the unmanned vehicle.

The visibility of the target object may be contingent upon a variety of factors such as, for example, environmental conditions (e.g., weather, lighting, background, and/or the like) and the distance between the unmanned vehicle and the search area (e.g., the flight altitude of the unmanned vehicle and/or the like). For example, the unmanned vehicle may capture the first image of the first region of the search area at the first distance from the search area but the target object in the first image may be rendered invisible to the first machine learning model by environmental conditions such as, for example, low lighting and/or high cloud coverage. Accordingly, in some example embodiments, the second machine learning model may identify the second region of the search area having the highest probability of including the target object based at least on the one or more factors affecting the visibility of the target object. For instance, the second region of the search area may be at the second distance from the search area having a maximum visibility level given the current environmental conditions. By navigating the unmanned vehicle to the second distance from the search area with the maximum visibility level, the localization engine may further prevent the unmanned vehicle from searching at the first distance from which the target object is invisible to the first machine learning model.

In some example embodiments, the localization engine may determine the sensing mode that is applied by the first machine learning model to determine the visibility of the target object in the one or more images of the search area captured by the unmanned vehicle. The localization engine may select between multiple sensing modes, each of which providing a different tradeoff between sensing cost and reliability. For example, the first machine learning model may apply a first sensing mode that is less computationally expensive but also less reliable when processing the second image captured at the second distance from the search area, which is associated with the maximum visibility level. In the event the first machine learning model applying the first sensing mode is unable to determine the visibility of the target object in the second image captured at the second distance associated with the maximum visibility level, the localization engine may select a more reliable and more computationally expensive second sensing mode to process the second image and/or a third image captured at the second distance associated with the maximum visibility level.

FIG. 1 depicts a system diagram illustrating an example of a target localization system 100, in accordance with some example embodiments. Referring to FIG. 1, the target localization engine may include an apparatus 110 and a client 120. The apparatus 110 may be an unmanned aerial vehicle (e.g., a drone and/or the like) that is capable of performing an aerial search. However, it should be appreciated that the apparatus 110 may be any unmanned vehicle including, for example, an unmanned ground vehicle, an unmanned surface vehicle, an unmanned underwater vehicle, an unmanned spacecraft, and/or the like. Furthermore, the apparatus 110 may be an autonomous vehicle that is at least capable of being navigated without human intervention. Meanwhile, the client 120 may be a processor-based device including, for example, a smartphone, a tablet computer, a laptop computer, a workstation, a wearable apparatus, and/or the like. As shown in FIG. 1, the apparatus 110 and the client 120 may be communicatively coupled via a network 130. The network 130 may be any wired and/or wireless network including, for example, a local area network (LAN), a virtual local area network (VLAN), a wide area network (WAN), a public land mobile network (PLMN), the Internet, and/or the like.

Figure 2:
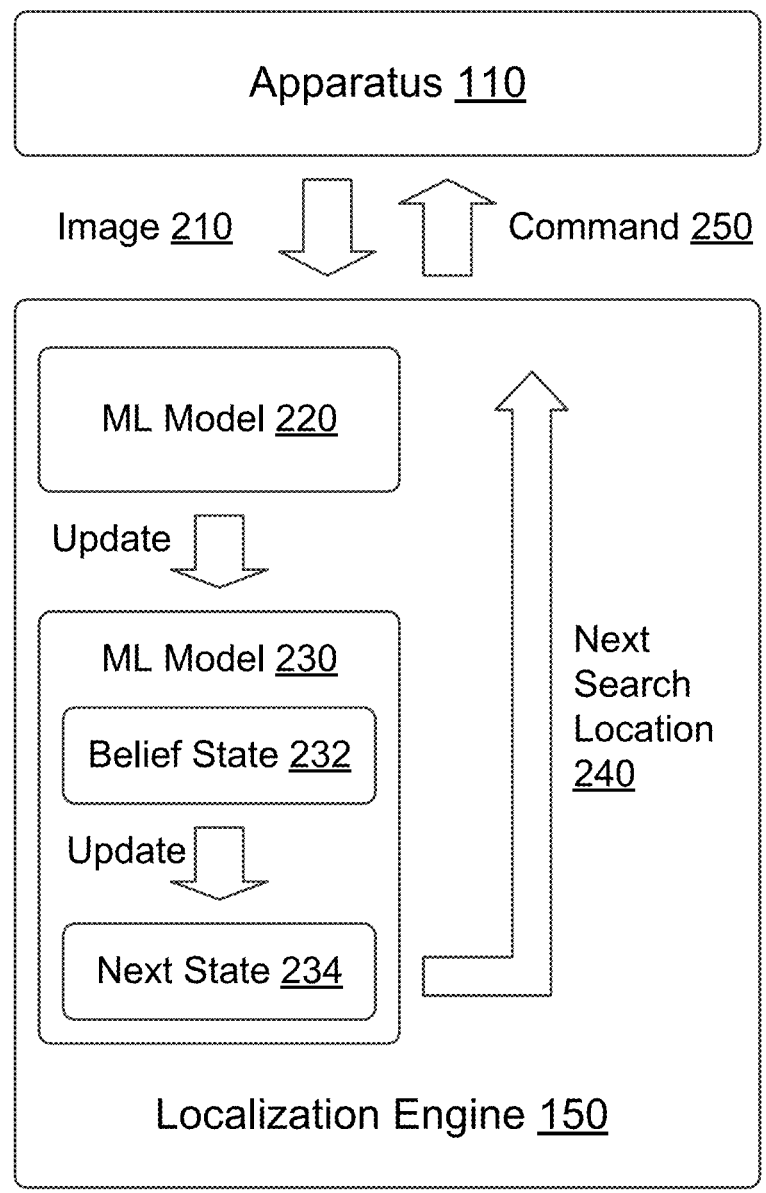
FIG. 2 depicts a block diagram illustrating an example data flow in a target localization system, in accordance with some example embodiments.

In some example embodiments, the client 120 may include a localization engine 150 configured to perform a search for a target object 140 in a search area including by navigating the apparatus 110 to capture one or more images of the search area. The localization engine 150 may navigate the apparatus 110 such that the apparatus 110 is able to operate autonomously during the search, without a need for human intervention. To further illustrate, FIG. 2 depicts a block diagram illustrating an example data flow in the target localization system 100, in accordance with some example embodiments. Referring to FIGS. 1-2, the apparatus 110 may send, to the localization engine 150, one or more images of a search area. For example, as shown in FIG. 2, the apparatus 110 may send, to the localization engine 150, an image 210, which may depict a first region of the search area.

The localization engine 150 may include a first machine learning model 220 and a second machine learning model 230. The first machine learning model 220 may be trained to determine the visibility of the target object 140 in one or more portions of the image 210, each of which corresponding to a sub-region within the first region of the search area. For example, the first machine learning model 220 may be a neural network (e.g., a convolutional neural network and/or the like) trained to assign, to the image 210, a first label (e.g., "1") if more than a threshold quantity of the target object 140 is visible in a portion the image 210 and a second label (e.g., "0") if less than the threshold quantity of the target object 140 is visible in the portion of the image 210.

In some example embodiments, the second machine learning model 230 may be a probabilistic machine learning model including, for example, a Markov decision process (e.g., a partially observable Markov decision process (POMDP)), a Bayesian network, and/or the like. The second machine learning model 230 may be trained to determine, based on existing beliefs regarding the location of the target object 140 within the search area, an optimal next search location 240 for the apparatus 110 that maximizes a reward including, for example, minimized sensing cost, minimized movement cost, and/or the like. Accordingly, FIG. 2 shows the second machine learning model 230 as including a belief state 232, which may correspond to a probability of the target object 140 being present in one or more regions of the search area as indicated by prior observations of the target object 140 as being visible and/or nonvisible in the images of the one or more regions of the search area. The belief state 232 of the second machine learning model 230 may be updated as the first machine learning model 220 processes images captured the apparatus 110 that depicts different regions of the search area. For example, FIG. 2 shows the belief state 232 being updated based on the output of the first machine learning model 220 indicating the target object 140 as being visible and/or nonvisible in the one or more portions of the image 210, which correspond to different sub-regions of the first region of the search area.

The second machine learning model 230 may be trained to identify, based at least on the target object 140 as being visible and/or non-visible in the images depicting the one or more sub-regions of the first region of the first search area, a second region of the search area having a highest probability of including the target object 140. Moreover, updating the belief state 232 may further update a next state 234 of the second machine learning model 230 to the second region of the search area having the highest probability of including the target object 140. The localization engine 150 may determine, based at least on the next state 234 of the second machine learning model 230, a next search location 240. For instance, in the example shown in FIG. 2, the next search location 240 may correspond to the second region of the search area having the highest probability of including the target object 140. Furthermore, as shown in FIG. 2, the localization engine 150 may navigate the apparatus 110 to the second region of the search area by at least sending, to the apparatus 110, a command 250 configured to steer the apparatus 110 to the second region in the search area.

The second region of the search area may be an optimal next search location because steering the apparatus to the second region of the search area (and not a third region of the search area) may maximize a reward including, for example, minimized sensing cost, minimized movement cost, and/or the like. For instance, the second region of the search area may correspond to one of the sub-regions of the first region of the search area having the highest probability of including the target object 140. As such, by navigating the apparatus 110 to the second region of the search area, the localization engine 150 may reduce movement cost by at least avoiding search locations that are unlikely to include the target object 140. Furthermore, navigating the apparatus 110 to the second region of the search area may include steering the apparatus 110 vertically to a distance (e.g., height) relative to the search area that is associated with a maximum visibility level, for example, by changing the flight altitude of the apparatus 110. Accordingly, by navigating the apparatus 110 to the second region of the search area, the localization engine 150 may further reduce movement cost and sensing cost by avoiding search locations where the target object 140 is rendered invisible to the first machine learning model 220 by, for example, environmental conditions, suboptimal distance between the apparatus 110 and the search area, and/or the like. For example, the first machine learning model 220 may be unable to detect the target object 140 due to a reduced quality of the image and/or a lack of exposure to training data representative of the current conditions.

Figure 3A:
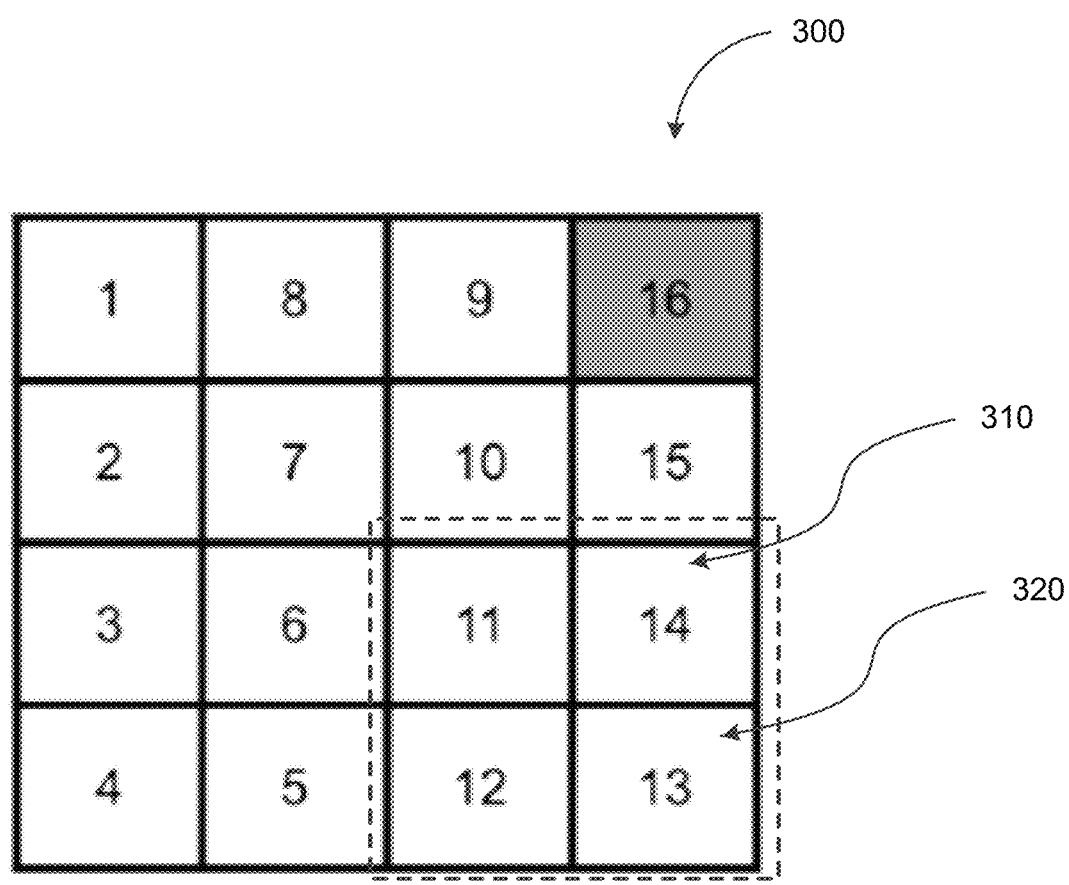
FIG. 3A depicts an example of a search area, in accordance with some example embodiments.

FIG. 3A depicts an example of a search area 300, in accordance with some example embodiments. In some example embodiments, the search area 300 may include multiple regions and/or sub-regions. In the example shown in FIG. 3A, the search area 300 may be partitioned into four sub-regions (e.g., quadrants) including, for example, a first region 310 and/or the like. Each of the four sub-regions may be further partitioned into additional sub-regions. For example, the first region 310 may be partitioned into four sub-regions (e.g., quadrants) including, for example, a second region 320.

Figure 3B:
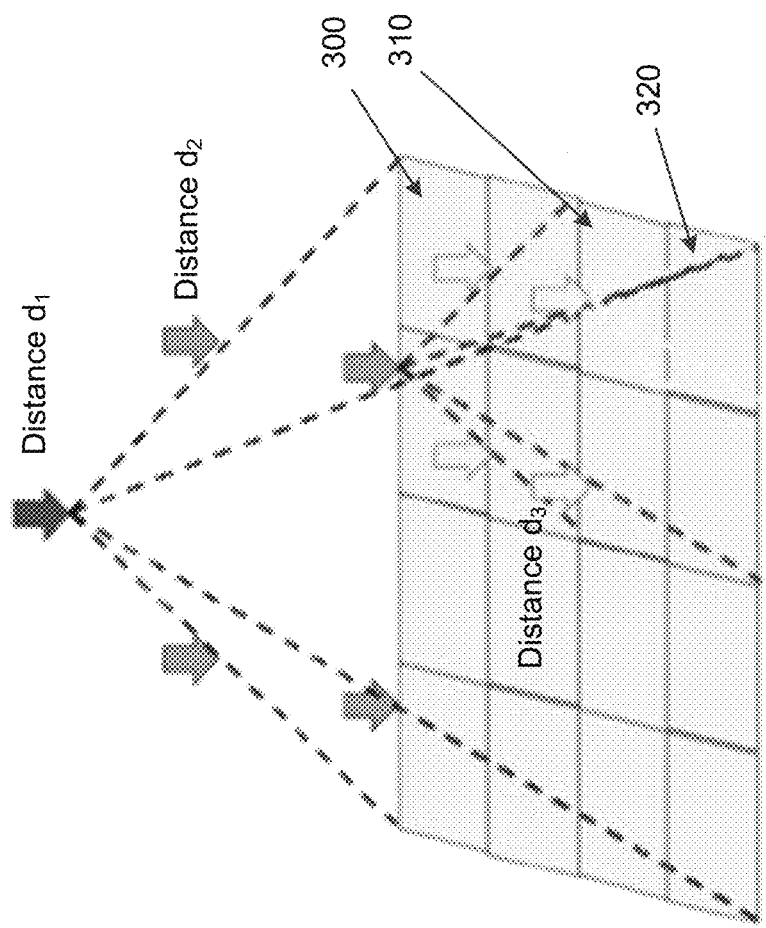
FIG. 3B depicts an example of a tree search, in accordance with some example embodiments.

In some example embodiments, the localization engine 150 may be configured to perform a tree search in which the apparatus 110 is steered horizontally across the search area 300 as well as vertically to different distances (e.g., heights) relative the search area 300. FIG. 3B depicts an example of the tree search, in accordance with some example embodiments. As shown in FIG. 3B, the localization engine 150 may steer the apparatus to a first distance $d_1$ relative to the search area 300 in order to capture a first image that depicts the search area 300 in its entirety. The first machine learning model 220 may process the first image to at least determine whether the target object 140 is visible and/or nonvisible in the portions of the first image corresponding to one or more of the sub-regions (e.g., quadrants) of the search area 300 including, for example, the first region 310.

The second machine learning model 230 may, based at least on the output of the first machine learning model 220 indicating the target object 140 as being visible and/or nonvisible in the portions of the first image depicting the one or more sub-regions (e.g., quadrants) of the search area 300, identify the first region 310 as having the highest probability of including the target object 140. As such, the localization engine 150 may subsequently steer the apparatus 110 to a second distance $d_2$ relative to the search area 300 in order to capture a second image of the first region 310. In the event the target object 140 is not found in the first region 310, the localization engine 150 may further steer the apparatus 110 to a third distance $d_3$ relative to the search area 300 in order to capture a third image of the second region 320. The second region 320 may a sub-region of the first region 310 that is identified as having the highest probability of including the target object 140 based at least on the output of the first machine learning model 220 indicating the target object 140 as being visible and/or nonvisible in the portions of the second image depicting the one or more sub-regions (e.g., quadrants) of the first region 310.

The visibility of the target object 140 may be contingent upon a variety of factors such as, for example, environmental conditions (e.g., weather, background, light, and/or the like) and the distance between the apparatus 110 and the search area 300. As such, in some example embodiments, the localization engine 150 may navigate the apparatus 110 to the first distance $d_1$, the second distance $d_2$, and/or the third distance $d_3$ based at least on a visibility level at each of the first distance $d_1$, the second distance $d_2$, and/or the third distance $d_3$. For example, the localization engine 150 may steer the apparatus 110 to the second distance $d_2$ instead of the first distance $d_1$ and/or the third distance $d_3$ based at least on the second machine learning model 230 determining that the second distance $d_2$ is associated with a higher visibly level than the first distance $d_1$ and/or the third distance $d_3$.

By navigating the apparatus 110 to a distance from the search area 300 associated with the maximum visibility level, the localization engine 110 may avoid prolonged searches at distances where the first machine learning model 220 is unable to accurately determine the visibility of the target object 140. For instance, the first machine learning model 220 may be unable to accurately determine the visibility of the target object 140 in images captured above and/or below a threshold distance from the search area 300. Alternatively and/or additionally, the first machine learning model 220 may be unable to accurately determine the visibility of the target object 140 if the target object 140 is obscured due to environmental conditions including, for example, weather, lighting, background, and/or the like.

Figure 3C:
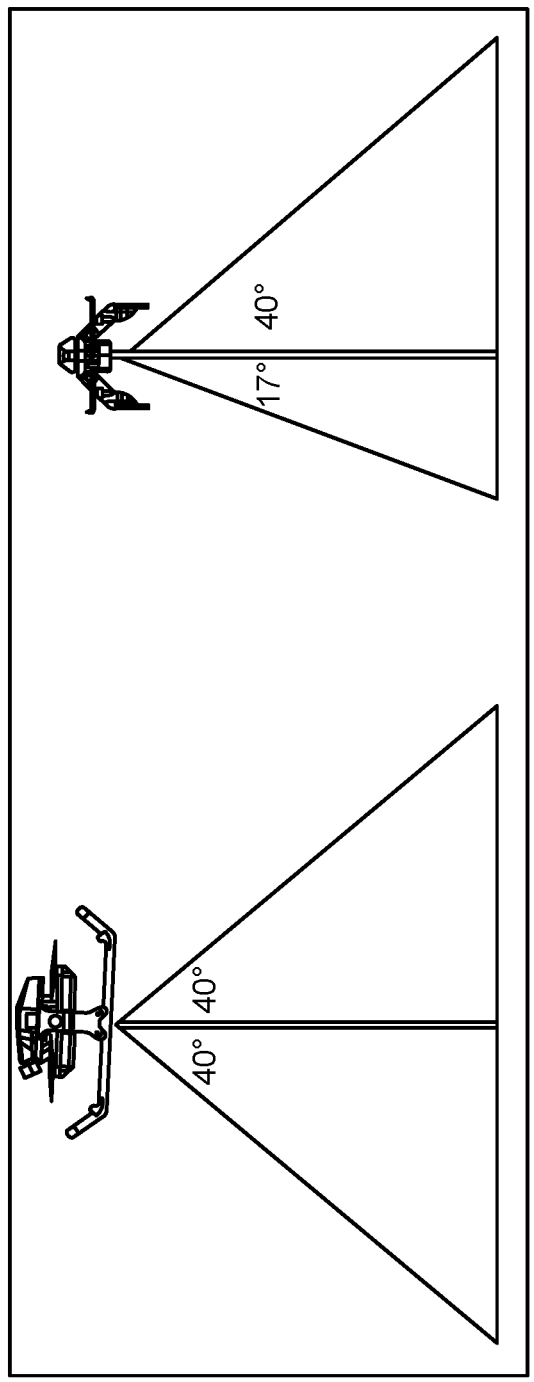
FIG. 3C depicts examples of a field of view of an unmanned vehicle, in accordance with some example embodiments.

FIG. 3C depicts examples of a field-of-view of the apparatus 110, in accordance with some example embodiments. The field-of-view (FOV) of the apparatus 110 may correspond to an area that is captured by an image sensor of the apparatus 110. As such, if the image sensor is associated with a fixed focal length and size, the field-of-view (FOV) of the apparatus 110 may include different-sized regions of the search area 300 when the apparatus 110 is steered to different distances (e.g., heights) relative to the search area 300. For example, referring again to FIGS. 3A-B, the field-of-view of the apparatus 110 may include the entire search area 300 when the apparatus 110 is at the first distance $d_1$. Steering the apparatus 110 to the second distance $d_2$ relative to the search area 300 may change the field-of-view of the apparatus 110 to include the first region 310 within the search area 300 while steering the apparatus to the third distance $d_3$ relative to the search area 300 may further change the field-of-view of the apparatus 110 to include the second region 320 within the first region 310.

Figure 4A:
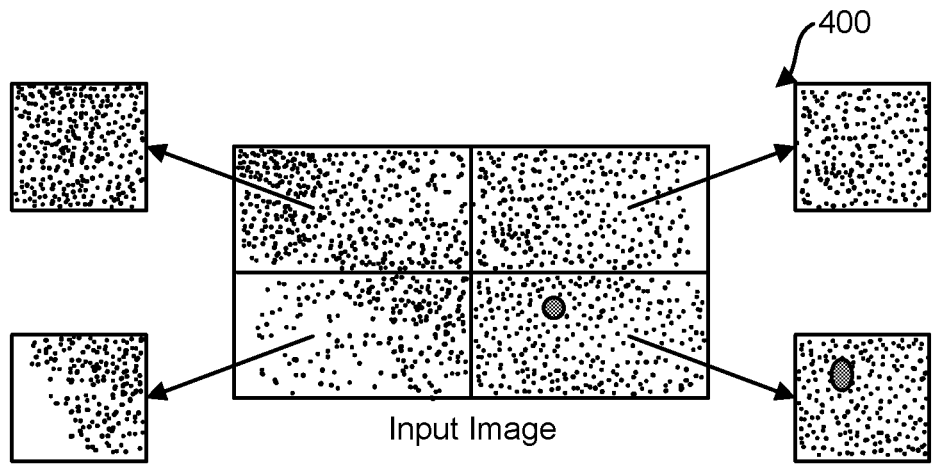
FIG. 4A depicts an example a sensing mode, in accordance with some example embodiments.
Figure 4B:
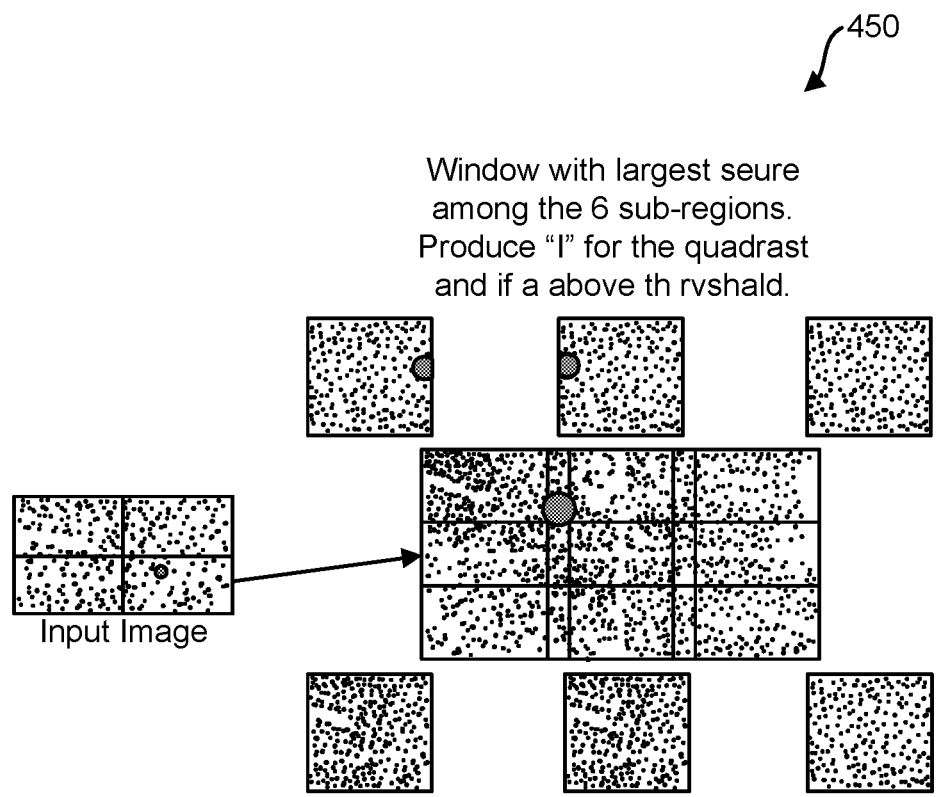
FIG. 4B depicts another example of a sensing mode, in accordance with some example embodiments.
Figures 6A, 6B, 6C:
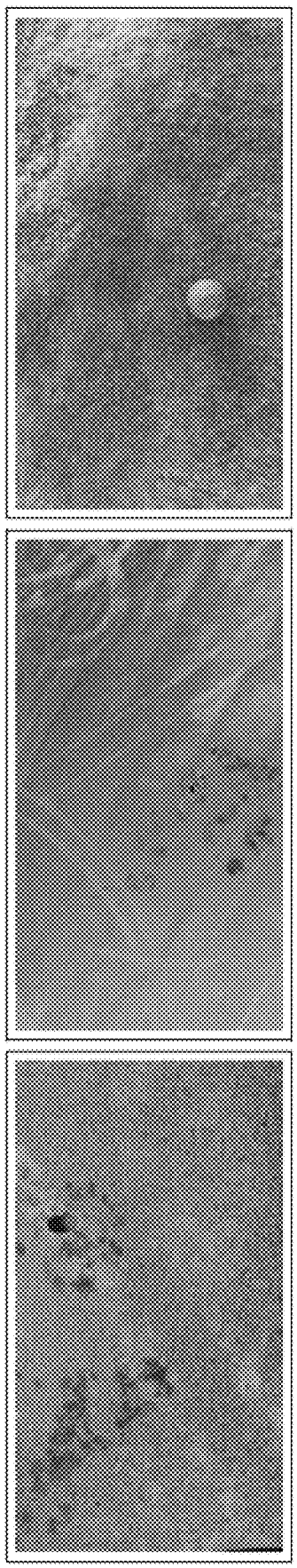
FIG. 6A depicts an example of a training image, in accordance with some example embodiments.
FIG. 6B depicts another example of a training image, in accordance with some example embodiments.
FIG. 6C depicts another example of a training image, in accordance with some example embodiments.
Figures 6D, 6E, 6F:
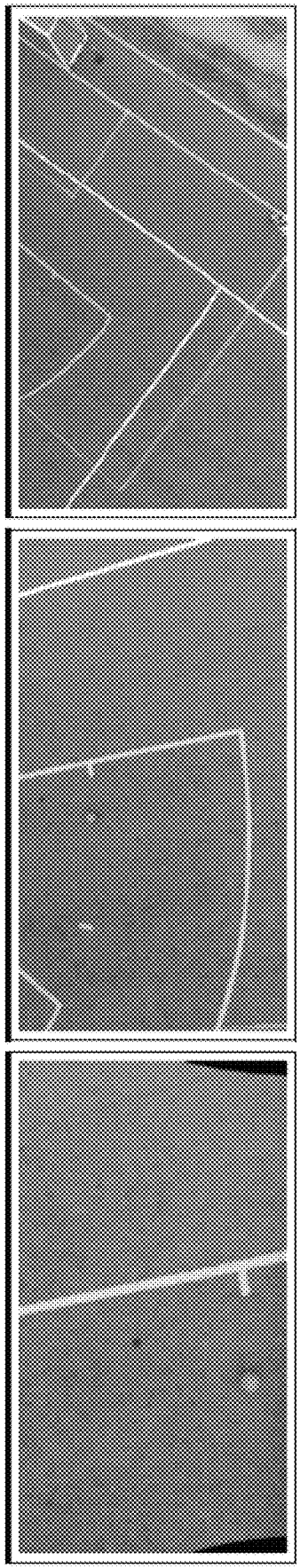
FIG. 6D depicts another example of a training image, in accordance with some example embodiments.
FIG. 6E depicts another example of a training image, in accordance with some example embodiments.
FIG. 6F depicts another example of a training image, in accordance with some example embodiments.

In some example embodiments, the localization engine 150 may further be configured to determine the sensing mode that is applied by the first machine learning model 220 to determine the visibility of the target object 140 in the one or more images of the search area 300 captured by the apparatus 110. The localization engine 150 may select between multiple sensing modes, each of which providing a different tradeoff between sensing cost and reliability. To further illustrate, FIGS. 4A-B depict examples of different sensing modes, in accordance with some example embodiments. Referring to FIGS. 4A-B, FIG. 4A depicts an example of a first sensing mode 400 that is less computationally expensive and less accurate while FIG. 4B depicts an example of a second sensing mode 450 that is more computationally expensive and more accurate.

As shown in FIG. 4A, the first machine learning model 220 applying the first sensing mode 400 may process an image of the search area 300 by at least resizing each portion (e.g., quadrant) of the image before determining the visibility of the target object 140 (e.g., a basketball in the examples shown in FIGS. 4A-B) in each of the resized portion of the image. By contrast, the first machine learning model 220 applying the second sensing mode 450 may process an image of the search area 300 by processing multiple crops of each portion (e.g., quadrant) of the image of the search area 300 to determine the visibility of the target object 140. Accordingly, the first machine learning model 220 applying the second sensing mode 450 may process overlapping portions of the image of the search area 300. The second sensing mode 450 may therefore be more computationally expensive but also more reliable of the first sensing mode 400, which processes fewer, non-overlapping portions of the image of the search area 300.

Figure 8A:
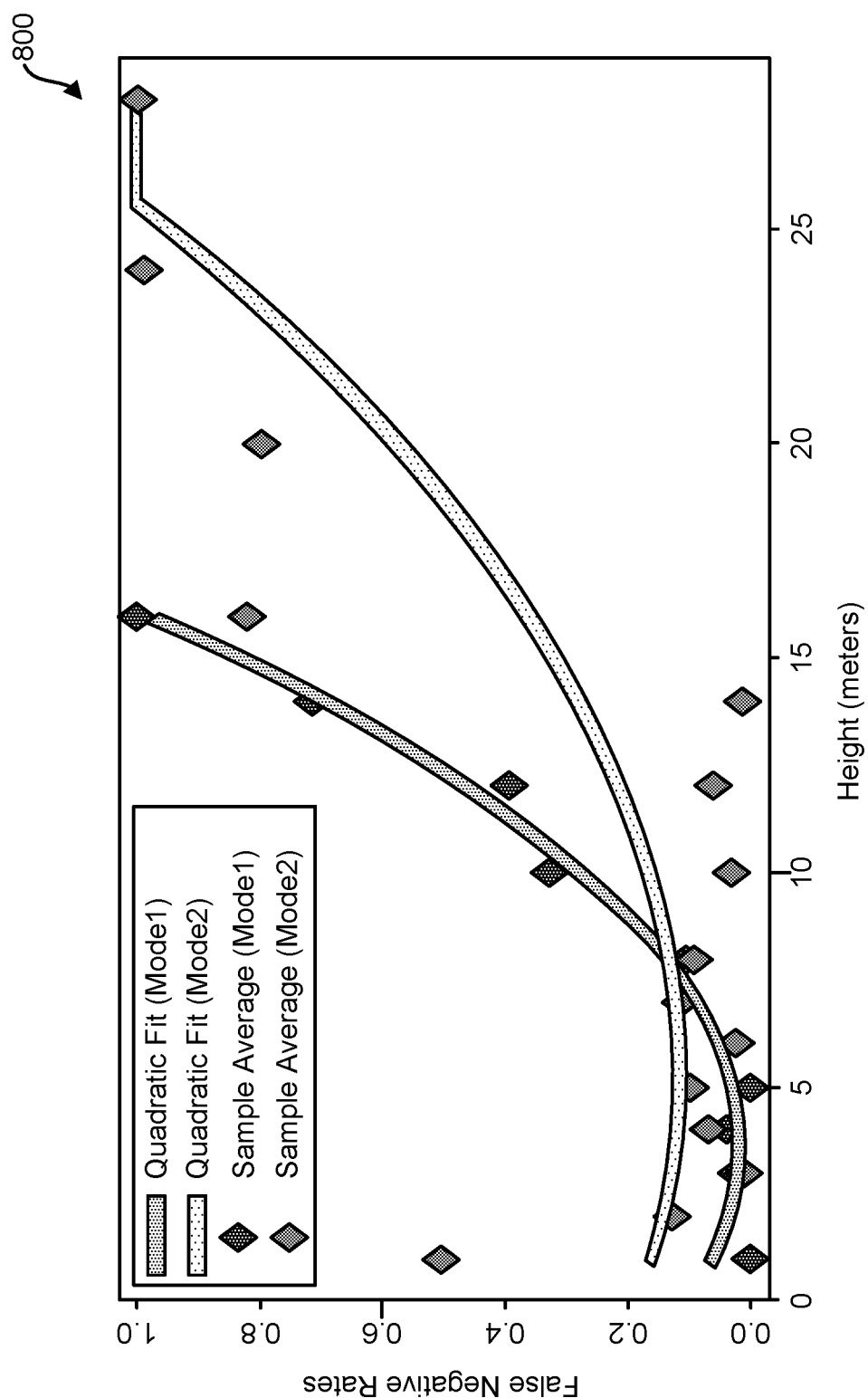
FIG. 8A depicts a graph illustrating a relationship between false negative rates and sensing modes, in accordance with some example embodiments.
Figure 8B:
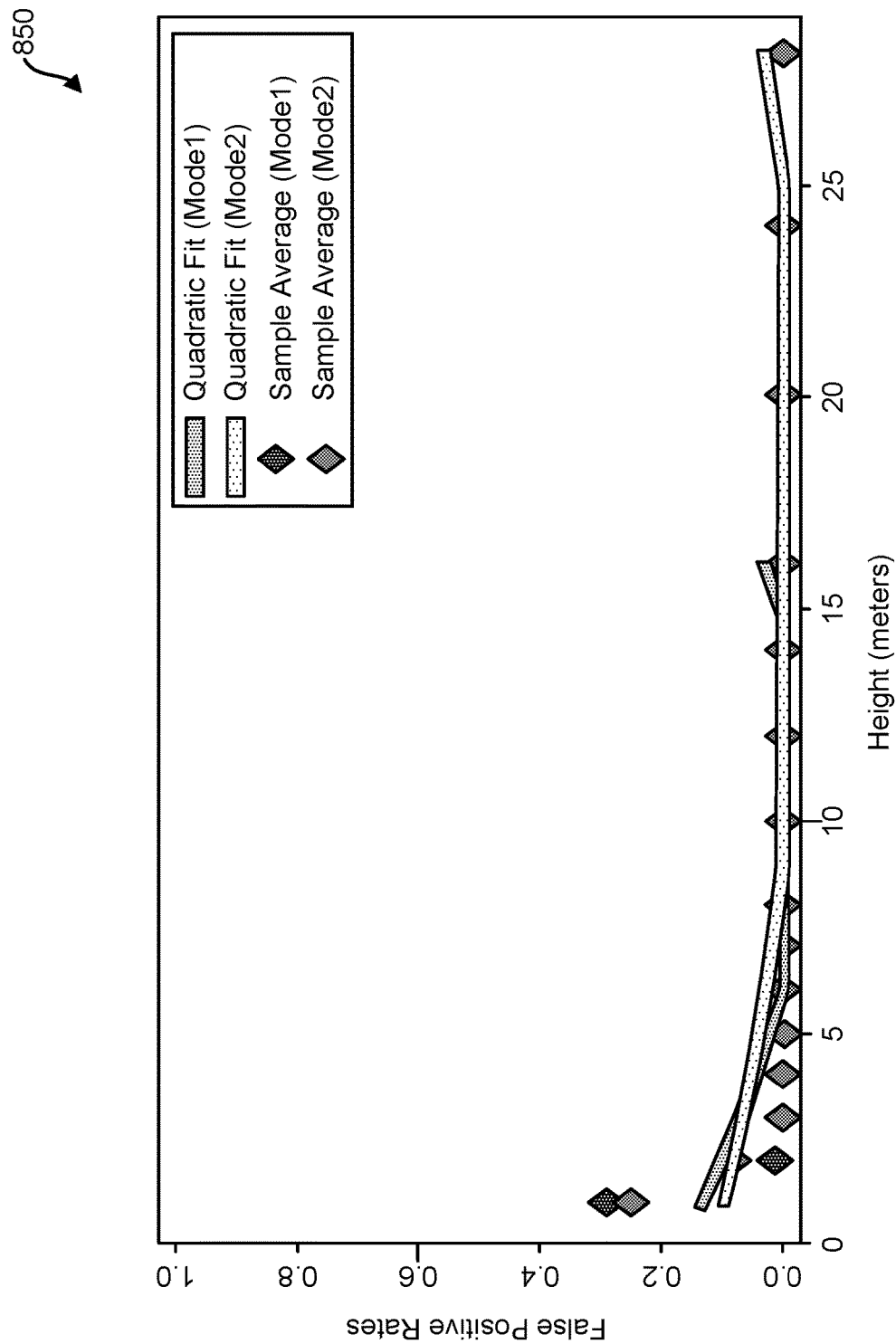
FIG. 8B depicts a graph illustrating a relationship between false positive rates and sensing modes, in accordance with some example embodiments.

As used herein, the reliability of a sensing mode may correspond to a quantity of false positives and/or false negatives associated the sensing mode. To further illustrate, FIGS. 8A-B depict graph illustrating the difference in the reliability of the first sensing mode 400 and the second sensing model 450. For example, FIG. 8A depicts a graph 800 illustrating the false negative rates associated with the different sensing modes while FIG. 8B depicts a graph 850 illustrating the false positive rates associated with the different sensing modes. The second sensing mode 450 may be more reliable than the first sensing mode 400 if the first machine learning model 220 applying the second sensing mode 450 achieves fewer false positives and/or false negatives than the first machine learning model 220 applying the first sensing mode.

Moreover, according to some example embodiments, the localization engine 150 may determine to apply the second sensing mode 450 instead of the first sensing mode 400 when the first machine learning model 220 applying the first sensing mode 400 is unable to determine the visibility of the target object 140 in an image captured at a distance associated with a maximum visibility level. As noted, the visibility of the target object 140 may be contingent upon environmental conditions (e.g., weather, lighting, background, and/or the like) as well as the distance between the apparatus 110 and the search area 300 (e.g., the flight altitude of the apparatus 110 and/or the like). Accordingly, the localization engine 150 may determine to apply the second sensing mode 450 instead of the first sensing model 400 when environmental conditions render the visibility of the target object 140 poor even if the apparatus 110 is at an optimal distance relative to the search area 300. By selecting a sensing mode based on the visibility of the target object (e.g., due to environmental conditions), the localization engine 150 may further reduce the sensing cost and/or movement cost associated with the search as shown in Table 1 below. As shown in Table 1, the localization engine 150 may improve the time required to locate the target object 140 in the search area 300 by selecting a sensing mode based on the visibility of the target object 140.

TABLE 1

| Method | Visibility | Baseline | Visibility | Baseline |
|---|---|---|---|---|
| Single | Time (seconds) | | Success Rate | |
| pv (12) = 0.2 | 44.09 | 46.76 | 99.82% | 99.81% |
| pv (12) = 0.4 | 45.72 | 48.35 | 99.88% | 99.78% |

TABLE 1-continued

| Method | Visibility | Baseline | Visibility | Baseline |
|---|---|---|---|---|
| pv (12) = 0.6 | 46.04 | 52.30 | 99.92% | 99.80% |
| pv (12) = 0.8 | 46.85 | 46.91 | 99.93% | 99.89% |
| Dual | Time (seconds) | | Success Rate | |
| pv (12) = 0.2 | 39.76 | 42.82 | 99.88% | 99.72% |
| pv (12) = 0.4 | 40.08 | 43.53 | 99.87% | 99.79% |
| pv (12) = 0.6 | 40.07 | 47.47 | 99.79% | 99.69% |
| pv (12) = 0.8 | 40.07 | 67.02 | 99.76% | 99.82% |

FIGS. 5A-C depict examples of variations in visibility levels, in accordance with some example embodiments. The images shown in FIGS. 5A-C are captured at a same distance (e.g., height) from the search area 300. Nevertheless, the target object 140 (e.g., a basketball in the examples shown in FIGS. 5A-C) may be rendered more or less visible due to environmental conditions such as, for example, weather, lighting, background, and/or the like. Accordingly, environmental conditions that reduce the visibility of the target object 140 may necessitate the more reliable sensing mode and/or a change in the distance between the apparatus 110 and the search area 300.

In some example embodiments, the localization engine 150 may perform the search for the target object 140 by at least optimizing the search path of the apparatus 110 including by determining one or more successive search locations for the apparatus 110 within the search area 300. For example, the localization engine 150 may perform the search in order to determine the location of the target object 140 in a two-dimensional plane corresponding to the search area 300, denoted as $I_{target} = [I_{min}^{la}, I_{max}^{la}] \times [I_{min}^{lo}, I_{max}^{lo}]$. Accordingly, the static location of the target object 140 within the search area 300 may be denoted as $Y_{target} \in I_{target}$. Moreover, the target object 140 may be uniformly distributed within the search area 300 denoted as $I_{target}$. That is, prior to commencing the search, the locational engine 150 may assume that the target object 140 has an equal probability of being present across every region of the $I_{target}$.

The search path of the apparatus 110 may span a three-dimensional space denoted as $I_{flight} = [I_{min}^{la}, I_{max}^{la}] \times [I_{min}^{lo}, I_{max}^{lo}] \times [I_{min}^{alt}, I_{max}^{alt}]$. Accordingly, the location X of the apparatus 110 at time t may be denoted as $X_t \in I_{flight}$. Moreover, at each time t, the localization engine 150 may determine a next action for the apparatus 110 including, for example, a next search location denoted as $N(x_t)$ as well as a sensing mode $a_{sense,t}$ selected from a finite set of sensing modes. For example, the next search location $N(x_t)$ may be one of the neighboring locations immediately adjacent to the current location of the apparatus 110 including, for example, the neighboring locations to the left, right, front, and back of the current location of the apparatus 110 as well as the neighboring locations that are above and below the current location of the apparatus 110. In addition to steering the apparatus 110 to the next search location $N(x_t)$, the localization engine 150 may select the sensing mode $a_{sense,t}$ such that the first machine learning model 220 applies the sensing mode $a_{sense,t}$ when processing the image that is captured by the apparatus at the next search location $N(x_t)$.

In some example embodiments, at any given time t and while the apparatus 110 is at any location $X_t \in I_{flight}$ the apparatus 110 may acquire an image that the first machine learning model 220 may process to derive a binary observation $O_t \in \{0, 1\}$ indicative of whether the target object 140 is visible within the field-of-view (FOV) of the apparatus 110 at time t and location $X_t \in I_{flight}$. For example, the first machine learning model 220 may be trained to output a first binary value if more than a threshold quantity of the target object 140 is visible in the field-of-view of the apparatus 110 and a second binary value if less than the threshold quantity of the target object 140 is visible within the field-of-view of the apparatus 110.

The binary observation $O_t$ output by the first machine learning model 220 may be susceptible to false positives and/or false negatives. One or more factors may skew the binary observation $O_t$ such that the binary observation $O_t$ does not necessarily correspond to a ground truth indicator $Y_t \in \{0,1\}$ of the actual presence of the target object 140 within the field-of-view of the apparatus 110. For example, Equation (1) below depicts a probabilistic model in which the binary observation $O_t$ is expressed as a function of a distance of the apparatus 110 relative to the search area 300 (denoted as $H_t$), a visibility V corresponding to environmental conditions (e.g., weather, background, lighting, and/or the like), and the ground truth indicator $Y_t$ of the actual presence of the target object 140 within the field-of-view of the apparatus 110.

$$\mathbb{P}(O_t = 1 \mid Y_t = y,\ H_t = h,\ V = v) = \begin{cases} 0 & \text{if } h \geq v \\ p_{0 \to 1}(h) & \text{if } h < v,\ y = 0 \\ 1 - p_{0 \to 1}(h) & \text{if } h < v,\ y = 1 \end{cases} \quad (1)$$

It should be appreciated that the values of $p_{0 \to 1}(h)$ and $1 - p_{0 \to 1}(h)$ may also be contingent upon the sensing mode $a_{sense,t}$ due to differences in the reliability of different sensing modes. Moreover, the visibility V may be assigned a prior distribution $p_V$, which may be determined based on data correlating visibility to various environmental conditions and/or distances from the search area 300. When the sensing mode $a_{sense,t}$ is selected from multiple sensing modes, each sensing mode may be associated with an independent prior distribution.

The localization engine 150 may determine an optimal search path for the apparatus 110 that maximizes a reward including, for example, minimized sensing cost, minimized movement cost, and/or the like. For example, each successive search location in the search path of the apparatus may be associated with a movement cost that may be dependent on a speed of the apparatus 110 and a sensing cost that may be dependent upon the sensing mode $a_{sense,t}$ selected by the localization engine 150. In the event the apparatus 110 is stopped, a positive reward may be given if the apparatus is at a minimum distance to the search area 300 (e.g., $H_t = I_{min}^{alt}$) and the target object 140 is actually present in the field-of-view of the apparatus 110 (e.g., $Y_t = 1$).

In some example embodiments, to determine the optimal search path for the apparatus 110, the second machine learning model 230 of the localization engine 150 may implement a Markov decision process (e.g., a partially observable Markov decision process (POMDP), a mixed observability Markov decision process (MOMDP), and/or the like) defined by the tuple $P = (S, \mathbb{P}_0, A, T, \Omega, H, R, \gamma)$ including states S, initial state distribution $\mathbb{P}_0$, actions A, transition function T, set of observations $\Omega$, observation function H, reward function R, and discount factor $\gamma$. The optimal search path for the apparatus 110 may be determined by at least The states $S = (\mathcal{X} \cup \{\xi, \Xi\}) \times \mathcal{Y} \times V$ may be quantized such that $\mathcal{X} \subseteq I_{flight}$ and $\mathcal{Y} \subseteq I_{target}$ are discrete grid points within the three-dimensional space $\mathcal{X}$ spanned by the search path of the apparatus 110 and the two-dimensional plane of the search area 300. An $N_{la} \times N_{lo} \times N_{alt}$ grid may be used to represent $\mathcal{X}$ while $N_{la} \times N_{lo}$ may correspond to its projection onto the two-dimensional ground plane $\mathcal{Y}$. Visibility V may denote the space of visibility levels. Because the three-dimensional space $\mathcal{X}$ includes an $N_{alt}$ quantity of different distances from the search area 300, visibility V may be described by $(N_{alt})^{N_{sense}}$ intervals covering $[0, \infty)$ for each sensing mode of an $N_{sense}$ quantity of sensing modes. The variables $\xi$ and $\Xi$ may denote the starting state and the ending state of the apparatus 110. The factor $(\mathcal{X} \cup \{\xi, \Xi\})$ may be observable whereas $\mathcal{Y}$ and V may be the hidden portions of the state space of the second machine learning model 230.

In some example embodiments, the observable state may be initialized at the starting state $\xi$. Meanwhile, as noted, the target object 140 $Y_{target} \in \mathcal{Y}$ may follow a uniform distribution and the visibility V may be assigned a prior distribution $p_V$. Since $\mathcal{X}$ may be a grid point, the next search location $N(X_t)$ of the apparatus 110 may be one of the four neighboring locations on a same horizontal plane as the current location of the apparatus 110 and/or one of the neighboring locations directly above and below the current location of the apparatus 110. Accordingly, the localization engine 150 may steer the apparatus 110 to the next search location $N(X_t)$ by at least sending, to the apparatus 110, the command 250 indicating an action $A_{fly} \in \{\text{left, right, forward, backward, up, down}\}$. Moreover, the localization engine 150 may determine a sensing mode $A_{sense}$ for the next search location $N(X_t)$. The stopping action for the apparatus may be denoted as $\Delta$. Accordingly, the action space A for the apparatus 110 may be denoted as $A = A_{fly} \times A_{sense} \cup \{\Delta\}$.

In some example embodiments, at the starting state $\xi$ (e.g., if $s = \xi$), the localization engine 150 may be configured to steer the apparatus 110 to a highest location (e.g., at the first distance $d_1$) at a center of the three-dimensional space $\mathcal{X}$ spanned by the search path of the apparatus 110. Alternatively, the apparatus 110 may be steered to the next search location $N(X_t)$ corresponding to the next action $\alpha_{fly}$. However, if the next action is a stopping action (e.g., $a = \Delta$) or if the next action $\alpha_{fly}$ leads to a location outside of the search area 300, the apparatus 110 may transition to the end state $\Xi$.

At each search location $N(X_t)$, the apparatus 110 may capture an image of the search area 300 such that the first machine learning model 220 may generate an observation $\Omega = \{0, 1, \text{nil}\}$ corresponding to whether the target object 140 is visible within the field-of-view of the apparatus 110. It should be appreciated that the observation may be nil if the next state of the apparatus 110 is the stopping state nil. Otherwise, the value of the observation $\Omega$ may be distributed in accordance with Equation (1).

In some example embodiments, an optimal next action $\alpha$ for the apparatus 110 may be determined by at least solving the Markov decision process problem (e.g., by applying a SAR-SOP solver and/or the like) to generate a piecewise linear function that approximates the value function and is represented as a set of $\alpha$-vectors with the length of the hidden states. Each observable state $s_{obs}$ may be associated with a set of $\alpha$-vectors denoted as $\Gamma(s_{obs})$. Moreover, each set of $\alpha$-vectors $\Gamma(s_{obs})$ may be associated with a unique action $\alpha(\alpha)$. If the belief vector on the hidden states is denoted as $b_t$, then the second machine learning model 230 may determine a next action α for the apparatus 110 in accordance with Equation (2) below.

$$a(\alpha) = \underset{\alpha \in \Gamma(s_{obs})}{\mathrm{argmax}}(\alpha \cdot b_t) \qquad (2)$$

In some example embodiments, the second machine learning model 230 may be a probabilistic machine learning model that is trained to generate a sequence of actions (e.g., $a_{fly}$ and $a_{sense}$) for the apparatus 110 that maximizes the reward function R including by minimizing, for example, the overall movement cost and sensing cost of the search for the target object 140. When maximizing the reward function R, the second machine learning model 230 may observe the discount factor γ, which may determine how much immediate rewards are favored over more distant rewards. Moreover, the second machine learning model 230 may be trained using a reinforcement learning technique, which trains the second machine learning model 230 to maximize the cumulative value of the reward function R. Examples of reinforcement learning techniques include Q-learning, Monte Carlo, state-action-reward-state-action (SARSA), deep Q network (DQN), deep deterministic policy gradient (DDPG), asynchronous actor-critic algorithm (A3C), trust region policy optimization (TRPO), proximal policy optimization (PPO), and/or the like.

As noted, the first machine learning model 220 may be trained to generate the observation Ω={0,1, nil} corresponding to whether the target object 140 is visible within the field-of-view of the apparatus 110. Meanwhile, the second machine learning model 230 may update, based at least on the observation Ω, the belief state 232 before updating the next state 234 to determine the optimal next action α for the apparatus 110. According to some example embodiments, the first machine learning model 220 may be a neural network (e.g., a convolutional neural network and/or the like) that is trained to determine the visibility of the target object 140 within the field-of-view of the apparatus 110 and output a binary value based on whether a threshold quantity of the target object 140 is visible in the field-of-view of the apparatus 110. The first machine learning model 220 may be trained based on training data that includes one or more training images in which the target object 140 is present as well as one or more training images in which the target object 140 is not present. A training image may be assigned a first label (e.g., "1") if more than a threshold portion of the target object 140 is present in the training image and a second label (e.g., "0") if less than the threshold portion of the target object 140 is present in the training image. Moreover, the training data may include training images captured at different distances (e.g., heights) and against different backgrounds. One or more of the training images may be subjected to further image processing (e.g., flipping, saturation adjustments, and/or the like) in order to introduce additional variations in the training data. To further illustrate, FIGS. 6A-F depict examples of training images that may be used to train the first machine learning model 220.

Figure 7:
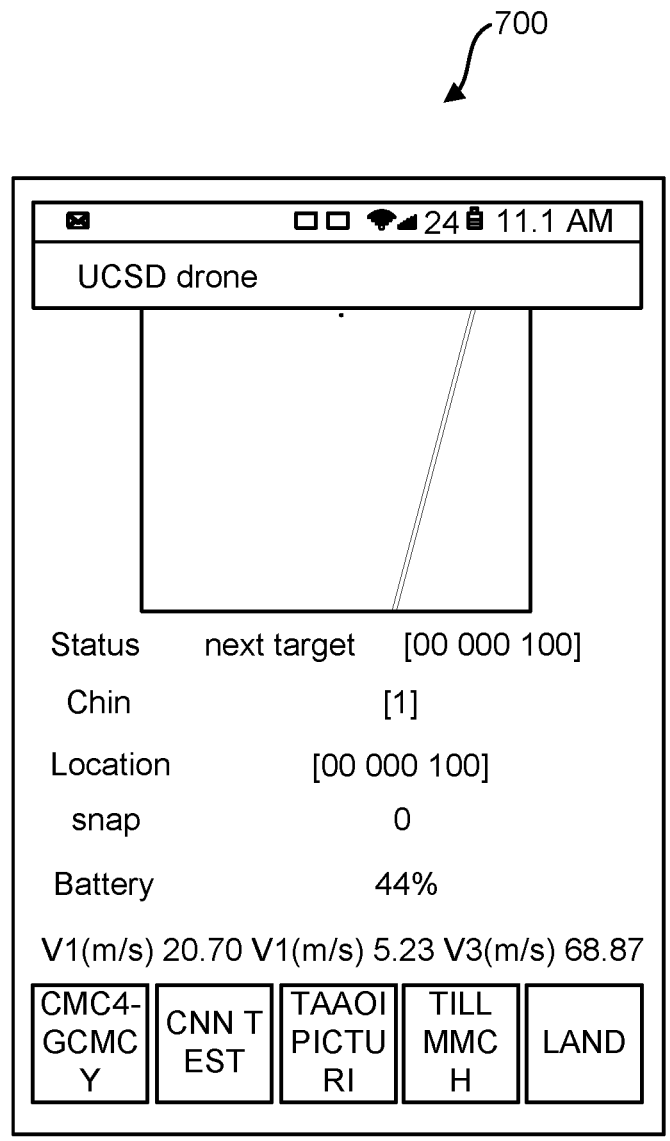
FIG. 7 depicts an example of a user interface, in accordance with some example embodiments.

FIG. 7 depicts an example of a user interface 700, in accordance with some example embodiments. In some example embodiments, the localization engine 150 may generate the user interface 700 for display at the client 120. As shown in FIG. 7, the user interface 700 be configured to display at least a portion of the data associated with the search being performed by the localization engine 150. Furthermore, the user interface 700 may be configured to receive inputs that enable a user at the client 120 to interact with the localization engine 150 and/or the apparatus 110.

Figure 9:
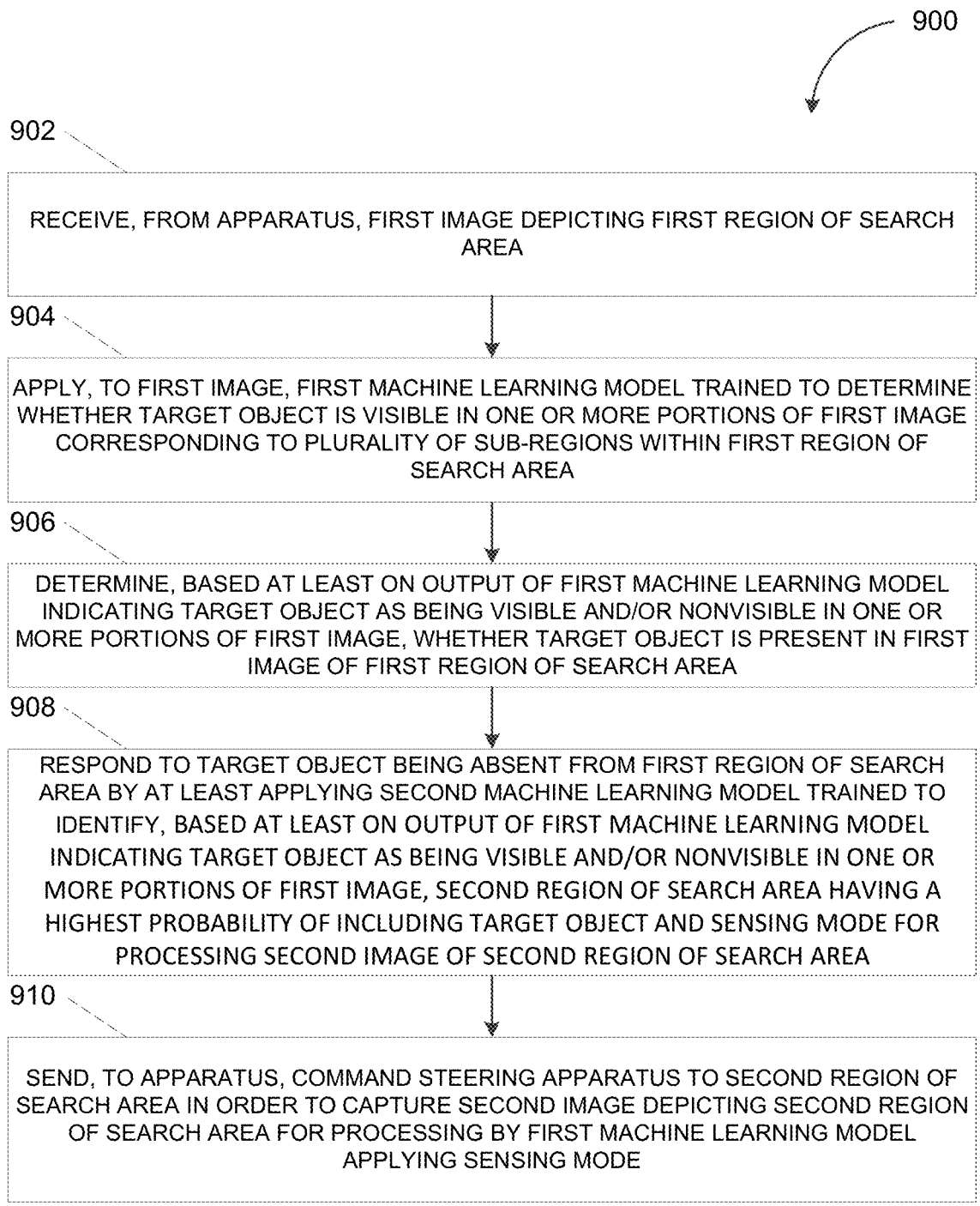
FIG. 9 depicts a flowchart illustrating an example of a process for target localization, in accordance with some example embodiments.

FIG. 9 depicts a flowchart illustrating a process 900 for target localization, in accordance with some example embodiments. Referring to FIGS. 1-2 and 9, the process 900 may be performed by the localization engine 150 in order to search for the target object 140 within the search area 300.

At 902, the localization engine 150 may receive, from the apparatus 110, a first image depicting a first region of a search area. For example, as shown in FIG. 2, the localization engine 150 may receive, from the apparatus 110, the image 210. The apparatus 110 may capture the image 210 at the first distance $d_1$ relative to the search area 300. Accordingly, the image 210 may depict the search area 300 in its entirety. Alternatively, the apparatus 110 may capture the image 210 at the second distance $d_2$ from the search area 300, in which case the image 210 may depict one of the sub-regions (e.g., quadrants) within the search area 300 including, for example, the first region 310.

At 904, the localization engine 150 may apply, to the first image, a first machine learning model trained to determine whether a target object is visible in one or more portions of the first image corresponding to a plurality of sub-regions within the first region of the search area. In some example embodiments, the localization engine 150 may include the first machine learning model 220, which may be a neural network (e.g., a convolutional neural network and/or the like) trained to determine whether the target object 140 is visible within one or more portions of the image 210. For example, the first machine learning model 210 may determine whether the target object 140 is visible within the portion of the image 210 corresponding to the first region 310.

At 906, the localization engine 150 may determine, based at least on an output of the first machine learning model indicating the target object as being visible and/or nonvisible in the one or more portions of the first image, whether the target object is present in the first image of the first region of the search area. For example, the output of the first machine learning model 220 may indicate, to the localization engine 150, that the first machine learning model 220 is unable to detect the target object 140 within the image 210. The first machine learning model 220 may be unable to detect the target object 140 due to a variety of factors including, for example, environmental conditions, the first distance $d_1$ between the apparatus 110 and the search area 300 being suboptimal, and/or the like. Accordingly, the localization engine 150 may continue the search for the target object 140 if the output of the first machine learning model 220 indicates that the first machine learning model 220 is unable to detect the target object 140 within the image 210.

At 908, the localization engine 150 may respond to the target object being absent from the first region of the search area by at least applying a second machine learning model trained to identify, based at least on the output of the first machine learning model indicating the target object as being visible and/or nonvisible in the one or more portions of the first image, a second region of the search area as having a highest probability of including the target object and a sensing mode for processing a second image of the second region of the search area. In some example embodiments, the second machine learning model 230 may be a probabilistic machine learning model (e.g., a Markov decision process, a Bayesian network, and/or the like) trained to determine, based on existing beliefs regarding the location of the target object 140 within the search area 300, the next search location 240 for the apparatus 110. The next search location 240 may maximize a reward including, for example, minimized sensing cost, minimized movement cost, and/or the like. Accordingly, as shown in FIG. 2, the second machine learning model 230 may update the belief state 232 of the second machine learning model 230 based on the output of the first machine learning model 220 indicating the target object 140 as being visible and/or nonvisible in the one or more portions of the image 210. Upon updating the belief state 232, the second machine learning model 230 may further update the next state 232 in order to identify the next search location 240 for the apparatus 110. For instance, the next search location 240 for the apparatus 110 may be the second region 320, which may correspond to one of the sub-regions of the first region 310 having the highest probability of including the target object 140.

In some example embodiments, the second machine learning model 230 may be further trained to select the sensing mode that is applied by the first machine learning model 220 when processing the image of the second region 320 of the search area 300. For example, as shown in FIGS. 4A-B, the localization engine 150 may select between the less computationally expensive and less accurate first sensing model 400 and the more computationally expensive and more accurate second sensing model 450. The localization engine 150 may select the second sensing mode 450 instead of the first sensing mode 400 if the first machine learning model 220 applying the first sensing mode 400 is unable to determine the visibility of the target object 140 in the image 210 even though the image 210 is captured at a distance associated with a maximum visibility level.

As noted, the visibility of the target object 140 may be contingent upon environmental conditions (e.g., weather, lighting, background, and/or the like) as well as the distance between the apparatus 110 and the search area 300 (e.g., the flight altitude of the apparatus 110 and/or the like). Accordingly, the second machine learning model 230 may determine to apply the second sensing mode 450 instead of the first sensing model 400 if the localization engine 150 determines that the visibility of the target object 140 poor due to environmental conditions even if the apparatus 110 is at an optimal distance relative to the search area 300. According to some example embodiments, the second machine learning model 230 may be trained to select a sensing mode based on the visibility of the target object (e.g., due to environmental conditions) in order to further reduce the sensing cost and/or movement cost associated with the search for the visibility of the target object 140.

At 910, the localization engine 150 may send, to the apparatus, a command steering the apparatus 110 to the second region of the search area in order to capture the second image depicting the second region of the search area for processing by the first machine learning model applying the sensing mode. For example, FIG. 2 shows the localization engine 150 sending, to the apparatus 110, the command 250 configured to steer the apparatus to the second region 320 of the search area 300, which may be associated with the highest probability of including the target object 140. As shown in FIGS. 3A-B, the second region 320 of the search area 300 may be one of the sub-regions within the first region 310 of the search area 300. Accordingly, steering the apparatus 110 to the second region 320 may include steering the apparatus 110 vertically, for example, from the first distance $d_1$ to the second distance $d_2$ in order to change the field-of-view of the apparatus 110 from the first region 310 to the second region 320.

In some example embodiments, the localization engine 150 may steer the apparatus 110 to the second region 320 while avoiding regions of the search area 300 that are unlikely to include the target object 140. Furthermore, the localization engine 150 may steer the apparatus 110 to the second distance $d_2$ associated with the second region 320 in order to avoid prolonged searches at distances from which the target object 140 is invisible to the first machine learning model 220 (e.g., due to poor image quality, environmental conditions, and/or the like). In doing so, the localization engine 150 may determine, for the apparatus 110, an optimal search path for the apparatus 110 that spans a three-dimensional space. As noted, the optimal search path may be associated with a minimized movement cost as well as a minimized sensing cost.

Figure 10:
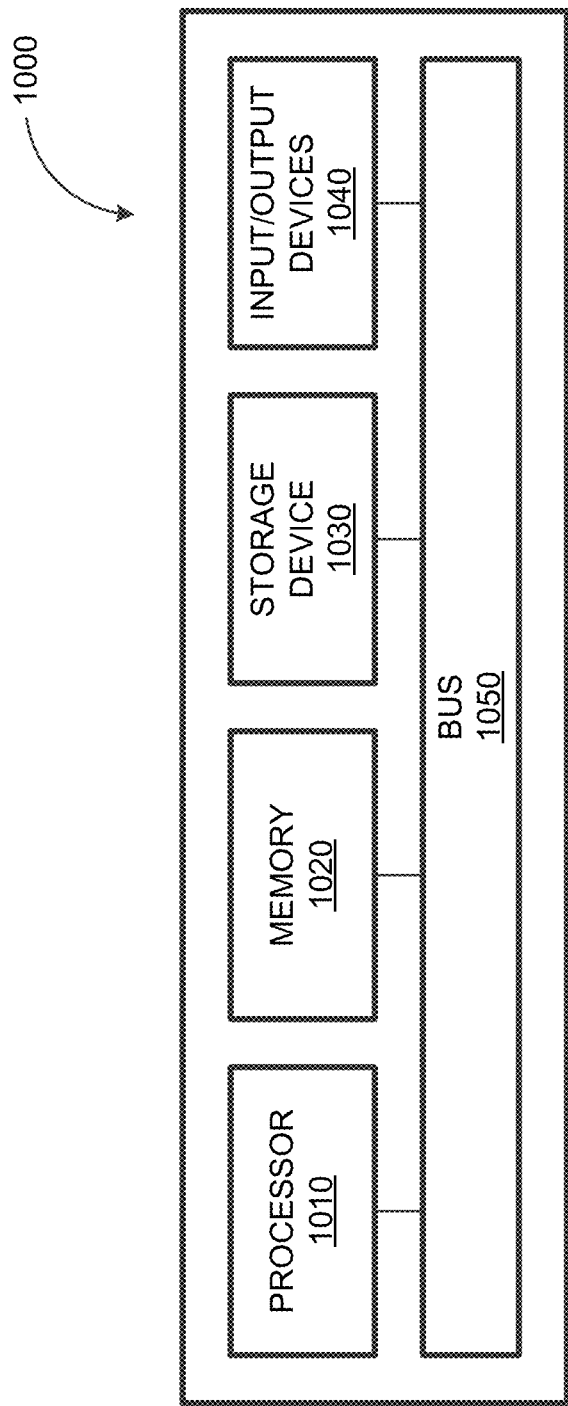
FIG. 10 depicts a block diagram illustrating a computing system, in accordance with some example embodiments.

FIG. 10 depicts a block diagram illustrating a computing system 1000, in accordance with some example embodiments. Referring to FIGS. 1 and 5, the computing system 1000 can be used to implement the localization controller 150 and/or any components therein.

As shown in FIG. 10, the computing system 1000 can include a processor 1010, a memory 1020, a storage device 1030, and input/output device 1040. The processor 1010, the memory 1020, the storage device 1030, and the input/output device 1040 can be interconnected via a system bus 1050. The processor 1010 is capable of processing instructions for execution within the computing system 1000. Such executed instructions can implement one or more components of, for example, the localization controller 150. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format. Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, and/or the like. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one processor; and
    at least one memory including program code which when executed by the at least one processor provides operations comprising:
        applying, to a first image captured by an apparatus, a first machine learning model trained to determine whether a target object is visible in one or more portions of the first image, the first image depicting a first region of a search area, and the one or more portions of the first image corresponding to a first plurality of sub-regions within the first region of the search area;
        in response to the target object being absent from the first image of the first region of the search area, applying a second machine learning model trained to identify, based at least on an output of the first machine learning model indicating the target object as being visible and/or nonvisible in the one or more portions of the first image, a second region of the search area corresponding to one of the first plurality of sub-regions within the first region of the search area having a highest probability of including the target object; and
        sending, to the apparatus, a command navigating the apparatus to the second region of the search area in order to capture a second image of the second region of the search area.

2. The system of claim 1, wherein the first image of the first region is captured at a first distance relative to the search area, and wherein the apparatus is navigated, based at least on a second distance relative to the search area being associated with a higher visibility level than the first distance, to the second distance in order to capture the second image of the second region.

3. The system of claim 2, wherein the second machine learning model is further trained to determine, based at least on a visibility of the target object determined by the second distance relative to the search area and by one or more environmental conditions, a first sensing mode for processing a second image of the second region of the search area.

4. The system of claim 3, wherein the second machine learning model identifies the first sensing model in response to the second distance being associated with a maximum visibility level and the first machine learning model being unable to detect the target object in the second image by applying a second sensing mode.

5. The system of claim 1, wherein the second machine learning model is configured to update, based at least on the output of the first machine learning model indicating the target object as being visible and/or nonvisible in the one or more portions of the first image, a probability distribution of the target object being present in one or more regions of the search area, and wherein the second region of the search area is identified based at least on the updated probability distribution.

6. The system of claim 1, further comprising:
applying, to the second image of the second region of the search area, the first machine learning model in order to determine whether the target object is visible in one or more portions of the second image; and
in response to the target object being absent from the second image of the second region of the search area, navigating the apparatus to a third region of the search area having a next highest probability of including the target object.

7. The system of claim 6, wherein the second region of the search area and the third region of the search area form an optimal search path spanning a three-dimensional space, and wherein the second machine learning model is trained to determine the optimal search path by at least maximizing a reward function corresponding to a movement cost of the apparatus moving to different regions along the optimal search path and/or a sensing cost of detecting a presence of the target object at each region of the search area along the optimal search path.

8. The system of claim 7, wherein the second machine learning model is trained by applying one or more reinforcement learning techniques.

9. The system of claim 6, wherein the third region of the search area comprises another one of the first plurality of sub-regions within the first region of the search area, and wherein the apparatus is navigated to the third region of the search area by at least navigating the apparatus in a same horizontal plane.

10. The system of claim 6, wherein the third region of the search area comprises one of a second plurality of sub-regions within the second region of the search area, and wherein the apparatus is navigated to the third region of the search area by at least navigating the apparatus vertically to a different distance relative to the search area.

11. The system of claim 1, wherein the apparatus comprises an autonomous unmanned vehicle.

12. The system of claim 1, wherein the first machine learning model comprises a neural network.

13. The system of claim 1, further comprising:
training, based at least on one or more training images, the first machine learning model, the one or more training images including a first image in which more than a threshold portion of the target object is visible and/or a second image in which less than the threshold portion of the target object is visible.

14. The system of claim 1, wherein the second machine learning model comprises a Markov decision process.

15. A computer-implemented method, comprising:
applying, to a first image captured by an apparatus, a first machine learning model trained to determine whether a target object is visible in one or more portions of the first image, the first image depicting a first region of a search area, and the one or more portions of the first image corresponding to a first plurality of sub-regions within the first region of the search area;
in response to the target object being absent from the first image of the first region of the search area, applying a second machine learning model trained to identify, based at least on an output of the first machine learning model indicating the target object as being visible and/or nonvisible in the one or more portions of the first image, a second region of the search area corresponding to one of the first plurality of sub-regions within the first region of the search area having a highest probability of including the target object; and
sending, to the apparatus, a command navigating the apparatus to the second region of the search area in order to capture a second image of the second region of the search area.

16. The method of claim 15, wherein the first image of the first region is captured at a first distance relative to the search area, and wherein the apparatus is navigated, based at least on a second distance relative to the search area being associated with a higher visibility level than the first distance, to the second distance in order to capture the second image of the second region.

17. The method of claim 16, wherein the second machine learning model is further trained to determine, based at least on a visibility of the target object determined by the second distance relative to the search area and by one or more environmental conditions, a first sensing mode for processing a second image of the second region of the search area.

18. The method of claim 17, wherein the second machine learning model identifies the first sensing model in response to the second distance being associated with a maximum visibility level and the first machine learning model being unable to detect the target object in the second image by applying a second sensing mode.

19. The method of claim 15, wherein the second machine learning model is configured to update, based at least on the output of the first machine learning model indicating the target object as being visible and/or nonvisible in the one or more portions of the first image, a probability distribution of the target object being present in one or more regions of the search area, and wherein the second region of the search area is identified based at least on the updated probability distribution.

20. A non-transitory computer-readable medium storing instructions, which when executed by at least one data processor, result in operations comprising:
applying, to a first image captured by an apparatus, a first machine learning model trained to determine whether a target object is visible in one or more portions of the first image, the first image depicting a first region of a search area, and the one or more portions of the first image corresponding to a first plurality of sub-regions within the first region of the search area;
in response to the target object being absent from the first image of the first region of the search area, applying a second machine learning model trained to identify, based at least on an output of the first machine learning model indicating the target object as being visible and/or nonvisible in the one or more portions of the first image, a second region of the search area corresponding to one of the first plurality of sub-regions within the first region of the search area having a highest probability of including the target object; and
sending, to the apparatus, a command navigating the apparatus to the second region of the search area in order to capture a second image of the second region of the search area.

* * * * *